United States Patent Office 3,055,892
Patented Sept. 25, 1962

3,055,892
1,2,3,4,4a,9,10,10a - OCTAHYDRO-6-HYDROXY-1,4a-DIMETHYL-1-OXYMETHYL-7-PHENANTHRENE-ALKANOIC ACID LACTONES AND INTERMEDIATES
Roy H. Bible, Jr., Morton Grove, Ill., assignor to G. D. Searle & Co., Chicago, Ill., a corporation of Delaware
No Drawing. Filed Aug. 12, 1960, Ser. No. 49,172
7 Claims. (Cl. 260—247.1)

This invention relates to 1,2,3,4,4a,9,10,10a-octahydro-6-hydroxy-1,4a-dimethyl-1 - oxymethyl-7-phenanthrenealkanoic acid lactones, intermediates thereto, and manufacturing processes. More particularly, this invention relates to chemical compounds of the formula

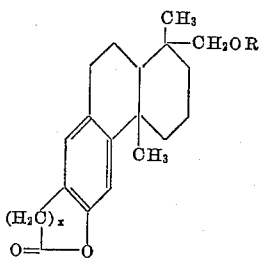

wherein R represents hydrogen or an alkanoyl radical, and $x$ represents a positive integer amounting to less than 3.

Among the alkanoyl radicals represented by R, especially lower alkanoyl radicals are preferred, which is to say radicals of the formula

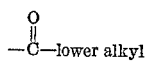

the lower alkyl constituent being such as methyl, ethyl, propyl, isopropyl, butyl, isobutyl, sec-butyl, tert-butyl, pentyl, isopentyl, tert-pentyl, neopentyl, hexyl, isohexyl, heptyl, octyl, and homologous groupings embracive of fewer than 9 carbon atoms.

The subject lactones are useful because of their valuable pharmacological properties, most specifically their capacity to block the effect of desoxycorticosterone acetate on urinary sodium and potassium, thus promoting diuresis.

Equivalent to the lactones hereof for the purposes of this invention are corresponding hydroxy acids, of the formula

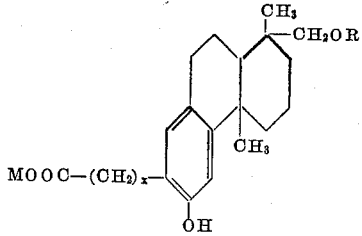

wherein R and $x$ are defined as before and M represents hydrogen, an alkali metal, or the ammonium radical. Likewise equivalent are the alkaline earth salts of the described hydroxy acids.

Manufacture of the foregoing products proceeds by heating a morpholide of the formula

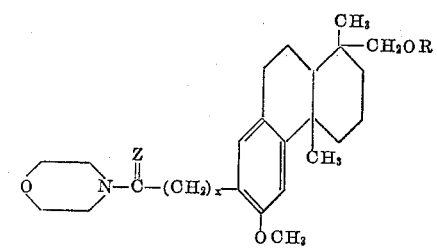

with aqueous pyridine hydrochloride, Z in the formula for the morpholide representing oxygen or sulfur, and R and $x$ having the meanings previously assigned. The 1-hydroxymethyl lactones which result are converted to 1-alkanoyloxymethyl lactones by heating with alkanoic acid anhydrides in the presence of mineral acid. As to the salts set forth as equivalents to the lactonized products, those skilled in the art will recognize that they are readily obtained from the apposite lactones on contact with appropriate aqueous bases, for example, NaOH, KOH, $NH_4OH$, $Ca(OH)_2$, etc. The free acids, in turn, are produced from the salts by a critically brief exposure to a proton source. Prolongation of exposure time induces lactonization.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. Specific rotations, observed at 25° C., are referred to the D line of sodium.

*Example 1*

(A) *4-(1-hydroxymethyl - 1,2,3,4,4a,9,10,10a - octahydro-6-methoxy-1,4a - dimethyl - 7 - phenanthrenethionopropionyl)morpholine.*—A mixture of 100 parts of 1,2,3,4,4a,9,10,10a - octahydro - 6 - methoxy - 1,4a - dimethyl-7-propionyl-1-phenanthrenemethanol, 64 parts of morpholine, and 24 parts of sulfur is heated at the boiling point under reflux for 10 hours, then diluted with 1800 parts of benzene and heated a further ½ hour at the boiling point under reflux. The resultant mixture is cooled and filtered free of insoluble solids. The filtrate is stripped of solvent by distillation, leaving a residue which crystallizes on trituration with ether. The crystalline material thus obtained is collected on a filter and recrystallized from a mixture of benzene and ether. Further recrystallization, this time from methanol, affords 4-(1 - hydroxymethyl - 1,2,3,4,4a,9,10,10a - octahydro-6 - methoxy - 1,4a - dimethyl - 7 - phenanthrenethionopropionyl)-morpholine, melting at approximately 154–155.5° and having a specific rotation of +29°. The product has the formula

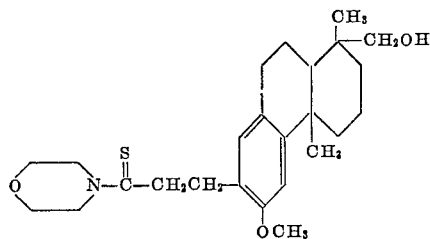

(B) *6 - hydroxy - 1 - hydroxymethyl - 1,2,3,4,4a,9,10, 10a - octahydro - 1,4a - dimethyl - 7 - phenanthrenepropionic acid δ-lactone.*—A mixture of 10 parts of 4-(1-hydroxymethyl - 1,2,3,4,4a,9,10,10a - octahydro - 6-methoxy - 1,4a - dimethyl - 7 - phenanthrenethionopropionyl)morpholine, 300 parts of pyridine hydrochloride, and 2 parts of water is distilled at such a rate that the vapor temperature reaches 195° after 15 minutes. The resultant mixture is heated at the boiling point under reflux for 10 minutes and then diluted with approximately 1500 parts of water, precipitating a brown solid which is filtered off, dried at 85–95°, and finally taken up in benzene. The benzene solution is chromatographed on silica gel, using benzene and ethyl acetate as developing solvents. From eluates comprising 10% ethyl acetate in benzene, on evaporation of solvent and crystallization of the residue from a mixture of acetone and hexane, 6-hydroxy - 1 - hydroxymethyl - 1,2,3,4,4a,9,10,10a - octahydro-1,4a-dimethyl-7-phenanthrenepropionic acid δ-lactone, melting at 188.5–191.5° and having a specific rotation of +66°, is obtained. The product has the formula

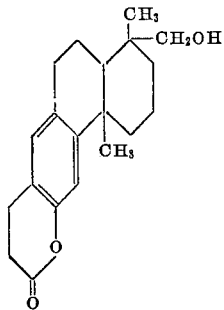

*Example 2*

(A) *4 - (1 - acetoxymethyl - 1,2,3,4,4a,9,10,10a - octahydro - 6 - methoxy - 1,4a - dimethyl - 7 - phenanthrenethionoacetyl)morpholine.*—A mixture of 22 parts of 1 - acetoxymethyl - 7 - acetyl - 1,2,3,4,4a,9,10,10a-octahydro-6-methoxy-1,4a-dimethylphenanthrene, 6 parts of sulfur, and 16 parts of morpholine is heated for 10 hours under reflux at temperatures of the order of 160°. The mixture is then extracted with benzene; and the benzene extract is chromatographed on silica gel, using benzene and ethyl acetate as developing solvents. From eluates comprising 10% ethyl acetate in benzene, on distillation of the solvent and crystallization of the residue from a mixture of acetone and hexane using decolorizing charcoal in process, there is obtained 4-(1-acetoxymethyl-1,2,3,4,4a,9,10,10a - octahydro - 6 - methoxy - 1,4a - dimethyl-7-phenanthrenethionoacetyl)morpholine, melting at 146.5-149.5°. The product has the formula

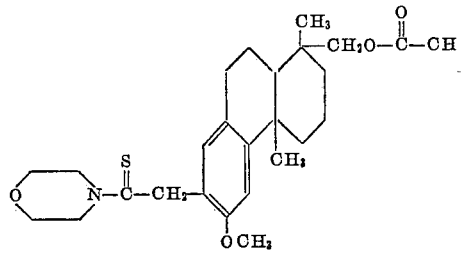

(B) *6 - hydroxy - 1 - hydroxymethyl - 1,2,3,4,4a,9,10, 10a - octahydro-1,4a-dimethyl-7-phenanthreneacetic acid γ-lactone.*—Substitution of 10 parts of 4-(1-acetoxymethyl - 1,2,3,4,4a,9,10,10a - octahydro - 6 - methoxy - 1,4a-dimethyl-7-phenanthrenethionoacetyl)morpholine for the 4 - (1 - hydroxymethyl - 1,2,3,4,4a,9,10,10a - octahydro-6 - methoxy - 1,4a - dimethyl - 7 - phenanthrenethionopropionyl)morpholine called for in Example 1B affords, by the procedure there detailed, 6-hydroxy-1-hydroxymethyl - 1,2,3,4,4a,9,10,10a - octahydro - 1,4a - dimethyl-7-phenanthreneacetic acid γ-lactone, of the formula

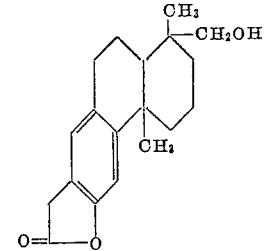

*Example 3*

*6 - hydroxy - 1,2,3,4,4a,9,10,10a - octahydro - 1,4a - dimethyl-1-propionyloxymethyl-7-phenanthreneacetic acid γ-lactone.*—A mixture of 100 parts of 6-hydroxy-1-hydroxymethyl - 1,2,3,4,4a,9,10,10a - octahydro - 7 - phenanthreneacetic acid γ-lactone, 500 parts of propionic anhydride, and 1 part of concentrated hydrochloric acid is heated at 70° for 30 minutes, then poured into 20,000 parts of water. The solid which separates is collected on a filter and recrystallized from aqueous methanol. The product thus obtained is 6-hydroxy-1,2,3,4,4a,9,10,10a-octahydro - 1,4a - dimethyl - 1 - propionyloxymethyl - 7-phenanthreneacetic acid γ-lactone, of the formula

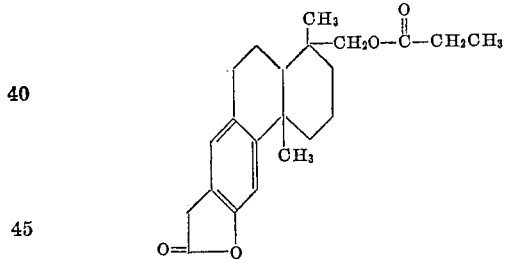

What is claimed is:
1. A compound of the formula

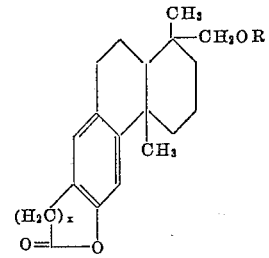

wherein R represents a member of the class consisting of hydrogen and lower alkanoyl radicals, and *x* represents a positive integer amounting to less than 3.

2. A compound of the formula

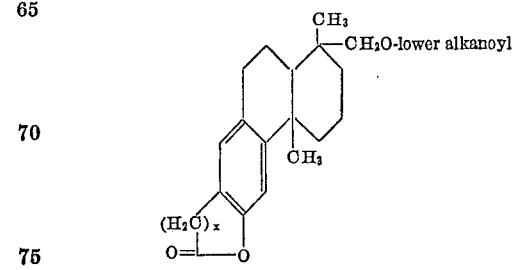

wherein $x$ represents a positive integer amounting to less than 3.

3. 6 - hydroxy - 1 - hydroxymethyl - 1,2,3,4,4a,9,10,10a - octahydro - 1,4a - dimethyl - 7 - phenanthrenepropionic acid δ-lactone.

4. 6 - hydroxy - 1 - hydroxymethyl - 1,2,3,4,4a,9,10,10a - octahydro - 1,4a - dimethyl - 7 - phenanthreneacetic acid γ-lactone.

5. A compound of the formula

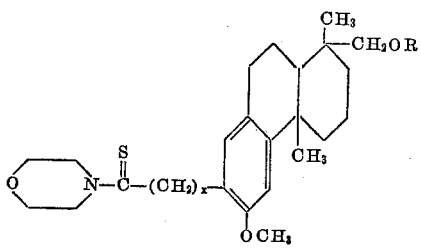

wherein R represents a member of the class consisting of hydrogen and lower alkanoyl radicals, and $x$ represents a positive integer amounting to less than 3.

6. 4 - (1 - hydroxymethyl - 1,2,3,4,4a,9,10,10a - octahydro - 6 - methoxy - 1,4a - dimethyl - 7 - phenanthrenethionopropionyl)morpholine.

7. 4 - (1 - acetoxymethyl - 1,2,3,4,4a,9,10,10a - octahydro - 6 - methoxy - 1,4a - dimethyl - 7 - phenanthrenethionoacetyl)morpholine.

References Cited in the file of this patent
UNITED STATES PATENTS
2,902,494    Bible _____ Sept. 1, 1959

UNITED STATES PATENT OFFICE
CERTIFICATE OF CORRECTION

Patent No. 3,055,892            September 25, 1962

Roy H. Bible, Jr.

It is hereby certified that error appears in the above numbered patent requiring correction and that the said Letters Patent should read as corrected below.

Column 2, line 62, for "propionyl)-morpholine" read -- propionyl)morpholine --; column 3, lines 65 to 75, upper right-hand portion of the formula, for

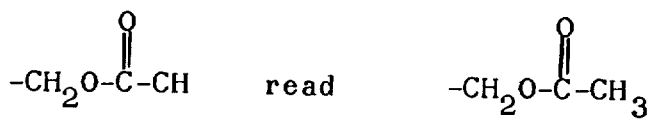

Signed and sealed this 31st day of December 1963.

(SEAL)
Attest:
RNEST W. SWIDER            EDWIN L. REYNOLDS

Attesting Officer            Acting Commissioner of Patents